(12) United States Patent
Miller

(10) Patent No.: US 8,996,617 B2
(45) Date of Patent: Mar. 31, 2015

(54) SYSTEM, PROCESS, OR METHOD FOR CREATION, PROPAGATION AND USE OF DYNAMIC FRACTIONAL PROXY IN COLLABORATIVE SOCIETAL DECISION MAKING WITHIN SOCIAL NETWORKS

(71) Applicant: Jeffrey F. Miller, Los Gatos, CA (US)

(72) Inventor: Jeffrey F. Miller, Los Gatos, CA (US)

( * ) Notice: Subject to any disclaimer, the term of this patent is extended or adjusted under 35 U.S.C. 154(b) by 246 days.

(21) Appl. No.: 13/787,804

(22) Filed: Mar. 7, 2013

(65) Prior Publication Data
US 2014/0258396 A1   Sep. 11, 2014

(51) Int. Cl.
G06F 15/16 (2006.01)
H04L 29/06 (2006.01)
G06F 11/00 (2006.01)
G06F 7/00 (2006.01)

(52) U.S. Cl.
CPC .................. *H04L 65/403* (2013.01)

USPC .............................. 709/204; 707/748; 705/12

(58) Field of Classification Search
None
See application file for complete search history.

(56) References Cited

U.S. PATENT DOCUMENTS

| | | | |
|---|---|---|---|
| 2005/0131722 A1* | 6/2005 | Hillis et al. | 705/1 |
| 2006/0021023 A1* | 1/2006 | Stewart et al. | 726/17 |
| 2009/0106080 A1* | 4/2009 | Carrier et al. | 705/10 |
| 2012/0324001 A1* | 12/2012 | Leacock et al. | 709/204 |
| 2013/0024786 A1* | 1/2013 | Dayal | 715/753 |

* cited by examiner

Primary Examiner — Wen-Tai Lin

(57) ABSTRACT

The present invention relates to voting systems, and more particularly to social network based voting systems. Aspects of the present invention relate to systems, methods and processes, computing devices, computer-implemented methods, computer programs stored on a computer-readable medium, and network communications used for the creation and use of dynamic fractional proxy in social network.

17 Claims, 14 Drawing Sheets

Figure 5A:
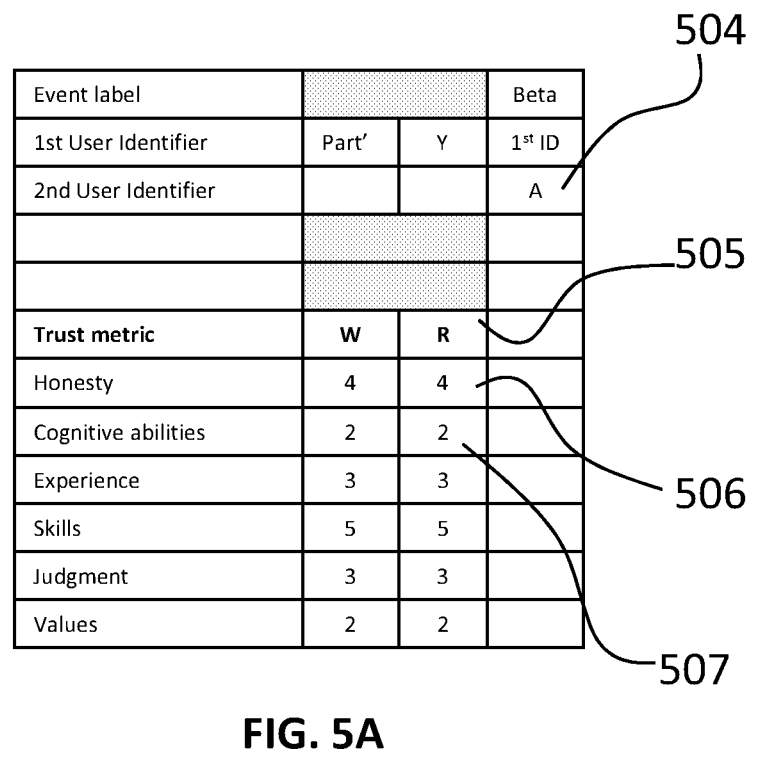

| Event label | | | Beta |
|---|---|---|---|
| 1st User Identifier | Part' | Y | 1st ID |
| 2nd User Identifier | | | A |
| | | | |
| | | | |
| Trust metric | W | R | |
| Honesty | 4 | 4 | |
| Cognitive abilities | 2 | 2 | |
| Experience | 3 | 3 | |
| Skills | 5 | 5 | |
| Judgment | 3 | 3 | |
| Values | 2 | 2 | |

| Event label | | | Beta |
|---|---|---|---|
| 1st User Identifier | Part' | Y | 1st ID |
| 2nd User Identifier | | | A |
| | | | |
| Confidence product | | | 50 |
| Trust metric | W | R | P |
| Honesty | 4 | 4 | 8 |
| Cognitive abilities | 2 | 2 | 8 |
| Experience | 3 | 3 | 9 |
| Skills | 5 | 5 | 15 |
| Judgment | 3 | 3 | 6 |
| Values | 2 | 2 | 4 |

| Event label | | | Beta |
|---|---|---|---|
| 1st User Identifier | Part' | Y | 1st ID |
| 2nd User Identifier | Part' | Y | A |
| Fractional proxy grant | | | .825 |
| Confidence product | | | 50 |
| Trust metric | W | R | P |
| Honesty | 4 | 4 | 8 |
| Cognitive abilities | 2 | 2 | 8 |
| Experience | 3 | 3 | 9 |
| Skills | 5 | 5 | 15 |
| Judgment | 3 | 3 | 6 |
| Values | 2 | 2 | 4 |

| Event label | | | |
|---|---|---|---|
| 1st User Identifier | Part' | Y | 1st ID |
| 2nd User Identifier | Part' | Y | Rep X |
| Fractional proxy grant | | | .825 |
| Confidence product | | | 50 |
| Trust metric | W | R | P |
| Honesty | 4 | 4 | 8 |
| Cognitive abilities | 2 | 2 | 8 |
| Experience | 3 | 3 | 9 |
| Skills | 5 | 5 | 15 |
| Judgment | 3 | 3 | 6 |
| Values | 2 | 2 | 4 |

# SYSTEM, PROCESS, OR METHOD FOR CREATION, PROPAGATION AND USE OF DYNAMIC FRACTIONAL PROXY IN COLLABORATIVE SOCIETAL DECISION MAKING WITHIN SOCIAL NETWORKS

CROSS-REFERENCE TO RELATED APPLICATIONS

Not Applicable

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of endeavor

The present invention relates generally to social networking, and more particularly to systems, processes or methods of voting and expression of preference in social collaborations. Social structures are the means by which humans combine efforts, expertise and knowledge to provide quality solutions to shared problems or to exploit opportunities. The basis for societal collaboration is the principal of one-person one-vote in which each member of society holds a natural right to a single vote, herein referred to as a single whole natural vote.

The information processing capabilities of a society are the bounding conditions within which all tradeoffs between the capacity and quality of decision making take place. Practical limitation of time and space upon information processing has historically hindered the effectiveness of collaborative decision-making and necessitated compromises to accommodate greater numbers of individuals and to increase the decision making capacity of collaborative processes. These compromises manifest themselves as reduced quality of decisions. The use of dynamically propagated trust metrics in the context of social networks can advance the quality of society's collaborative decision-making abilities, allowing the preference of individuals to be influential, not just upon those people they interact in one degree of separation, but through and beyond n degrees of separation.

2. State of the Art

Current voting methods within social networks are insufficient to realize the full potential for social network based collaborative decision making. Present state of the art voting in social networks can be classified as either opportunistic or solicited. Polling or surveying as a solicitation of user preference is done in ordered to characterize individual or market preference. Solicitation of preference is also used by administrators of social networks to invoke a greater sense of belonging, and to attract and retain users. Opportunistic expression of preference by voting within a social network is most often in the context of a specific event in which individuals are offered one or a few categorical choices. In practice, state of the art opportunistic voting had been in the form of a "Like" feature in which an individual user is given the opportunity to endorse another user, or to create a social recommendation.

Recommendations and endorsements are qualitative expressions of trust, whereas trust metrics are quantitative representations. Qualitative expressions of trust are a limitation to the scaling of collaborative processes to accommodate larger populations. Current limited use of quantitative trust metrics in social networks have been for verifying identification of users or agents, authorization of access to protected resources, or for controlling communications. In similar dearth, state of the art use of proxy within virtual communal spaces such as social networks has been limited to gaming proxy such as "Avatars", or other social agents. Limited systemic or automated use of proxy has been used for the prioritization of system resources as an element of adaptive system resource deployment.

The state of the art application of voting, and the use of trust metrics and proxy in social networks have been limited by use of antiquated constructs that do not take advantage of social network's ability to scale in extent and complexity. Trust metrics have been of limited use, and aside from a "Like" feature or a selection between a few "Endorse" buttons, have afforded no direct advancement to activities of individual users. Uses of proxy in social networks have been the granting of the whole of single privilege to another user or simulated user agent, rather than a division of proxy.

BRIEF SUMMARY

A basic human activity is collaborative decision making to solve a problem or maximizes the advantage afforded by opportunity. The potential of social networks to enable greater collaborative interaction has not been realized in part because of the absence of an effective means for expression of individual preference (voting) sufficient for effective collaboration within large populations, and which is adaptive to the structures of social networks.

Dynamic fractional proxy provides a way for large numbers of individuals to effectively participate in collaborative social decision making. Using dynamic fractional proxy, an individual has a choice to participate directly or to allocate their vote among others they feel represent their best interests, share their values, or possess greater expertise.

The creation and distribution of fractional proxy throughout a social network includes maintenance of dynamic linkage. As each individual chooses and may change their choices, those changes propagate throughout the network, dynamically shifting the issuance and re-issuance of proxy.

The options of individuals to participate directly or indirectly, to choose whom, and the amount of fractional proxy issued, as well as the automatic dynamic adjustment of proxy inherent to dynamic fractional proxy, is more capable than traditional voting methods when applied to collaborative societal decision making in large populations.

The present invention provides an alternative to the historic compromises to representative voting systems such as the limitations of time and space upon communication and the availability of knowledge. The present invention enables nearly the ideal of direct individual participation in democratic processes. Dynamic fractional proxy provides a key enabling element to more effective societal decision making through the practical use of social networking.

DETAILED DESCRIPTION

It will be appreciated that the system, process or method may vary as to configuration and as to details of the constituent elements of the present invention, and that the system, process, or method may vary as to the specific steps and sequence, without departing from the basic concepts as disclosed herein. Referring more specifically to the drawings, for illustrative purposes the present invention may be understood in the exemplary system and method generally shown in FIG. 1 through FIG. 8.

Specification Background

Social networks in the context of the present invention described herein, are any kind of social relationships or associations between a plurality of people, groups of people, companies, or programmable agent apparatus, collectively referred to as associated entities, which may be represented by a plurality of nodes connected by a plurality of labeled edges through which information may flow, and which may employ a device, such as a computer, smart phone, interactive television or personal communications or computing device, to establish and maintain a presence. The present invention applies to social networks where associated entities have a business relationship, a friendship, or any other type of association such as vendor/vendee relationships, political affiliations or shared hobbies, occupation, geography, citizenship, nationality, or academic endeavors.

The context in which dynamic fractional proxy is applicable is any social or societal collaboration taking place in a social network. Each such opportunity for collaborating participant entities to vote is referred to herein as an electoral event. Explicitly, as used in a preferred embodiment of the present invention, the general case of an electoral event is societal collaboration bounded in time in which participant associated entities, also known as users, have an opportunity or an obligation to express preference or preferences in voting related to one or more issues in which the expression of preference imparts influence upon the outcome of the collaboration. For example, an opportunity to vote for or against issuance of public bonds is an electoral event. An "election", in common parlance, may contain one or a number of choices, each of which is an electoral event in the context of the present invention.

Figure 1:
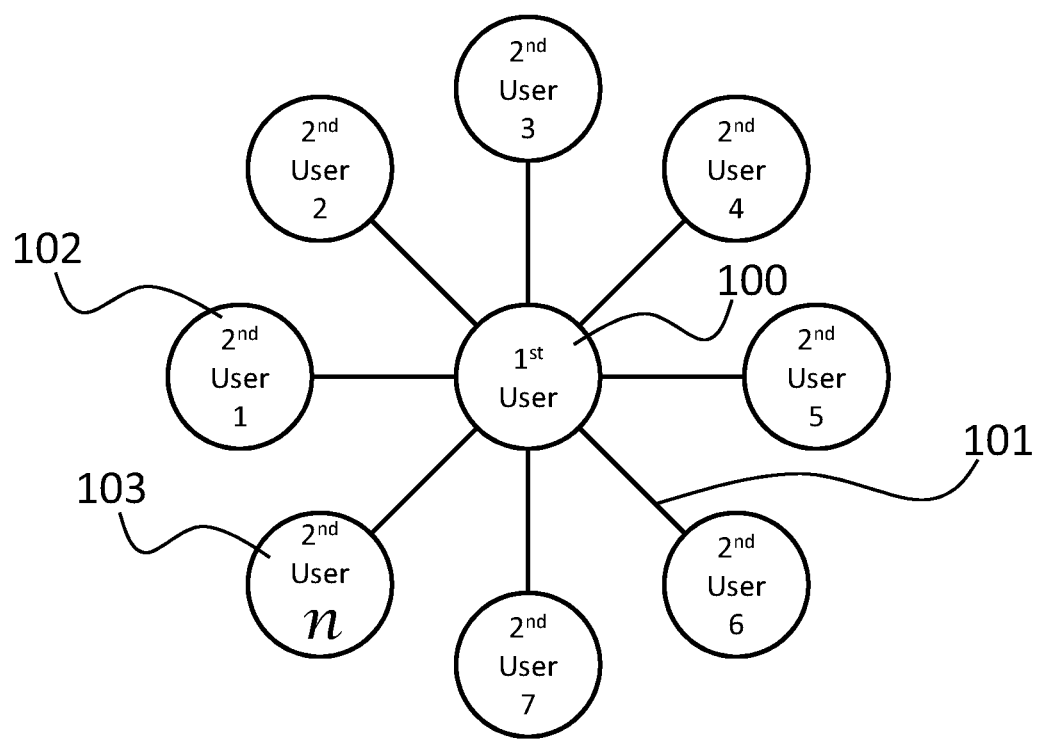
FIG. 1 presents a simple exemplary social network model

FIG. 1. Presents a simple exemplary social network diagram in which a 1st User 100 is connected directly with one or more 2nd Users 102, 103, through a plurality of edges 101 established by mutual consent, and through which users communicate and interact.

The preferred embodiment of the present invention utilizes any social network which can be represented by a plurality of labeled edges and labeled nodes representing participating users in a social network. These labels are commonly thought of as a character string, but can be any digital object. Thus participants in a social network are related to one another by a plurality of labeled edges, each edge being capable of communicating Real Number values.

Underlying Technology

This section portrays the underlying technology which enables production, distribution and use of dynamic fractional proxy in social networks. It should be noted that throughout, the term "proxy" may be used to express the singular or plural case of proxy. In the context of the present invention a proxy is a 1st Users authorization to vote on their behalf in an electoral event.

The distinction between the terminology of a 1st User and a 2nd User is semantic and employed herein for exemplary purposes to refer to the role in which a user within a social network functions in the creation and use of dynamic fractional proxy. A 1st User role is one in which the user grants fractional proxy to one or a plurality of 2nd Users with whom the 1st User has a direct relationship. A 2nd User role is one in which the user receives and accumulates fractional proxy granted by one or a plurality of 1st Users. An individual user can be expected, in a predominance of electoral events, to function simultaneously in both 1st User and 2nd User roles.

Simplified Flow Depicting Creation and Exercise of Dynamic Fractional Proxy

Figure 2:
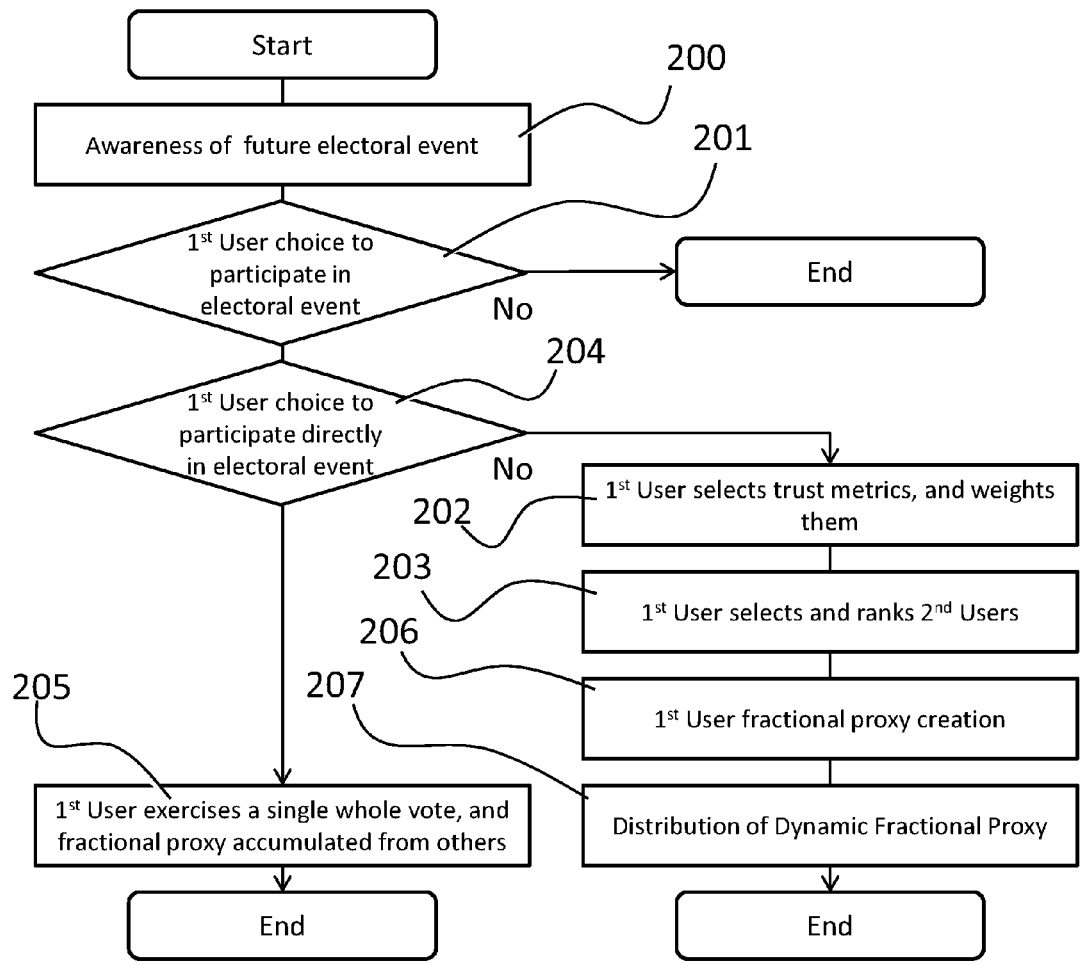
FIG. 2 provides a simplified flow of creation and exercise of dynamic fractional proxy

An exemplary simplified flow of the creation and exercise of dynamic fractional proxy is provided in FIG. 2. In the context of a social interaction within or among social networks, a 1st User becomes aware of a probable future electoral event 200 and decides to preserve an option to participate or not 201. If that 1st User decides not to preserve such an option to participate, the flow ends.

The example flow of FIG. 2 further depicts a user's intent 204 to participate in an electoral event either directly or indirectly. If direct participation is chosen, that 1st User exercises a single whole natural vote 205 as well as an accumulation of those fractional proxy received in the role of 2nd User from other users in the social network in the role of 1st User.

A 1st User choosing to participate in a particular electoral event, and further choosing indirect participation, will select and weight one or more a trust metrics 202. That 1st User then selects 203 from those users in their social network one or more 2nd Users to whom they consider granting proxy. That 1st User then ranks selected 2nd Users by use of the trust metric labels selected or other methods they may wish to employ.

If a 1st User chooses to participate in the electoral event indirectly, the example flows of FIG. 2 shows the creation of fractional proxy 206 from the sum of; the 1st User's single whole natural vote and those fractional proxy accumulated in the role of 2nd User from other users. The sum of that single whole natural vote and those accumulated proxy are then distributed as fractional proxy 207 among those selected $2^{nd}$ Users participating in that particular electoral event. The logical, mathematical or data elements used in the creation of those fractional proxy may be changed at any time prior to an electoral event by their originating 1st Users. When such a change occurs, those changes are immediately propagated throughout a social network to recipient 2nd Users of fractional proxy, thus the fractional proxy becomes dynamic.

Trust Metric Selection

In an exemplary preferred embodiment, a trust metric is used to express a 1st User's subjective determination of merit or importance, as well as to express the opinion of that 1st User of one or more 2nd Users. With the exemplary flows provided in FIG. 3A, an example data set containing the labels and attributes for the selected trust metrics as well as an event specific label is provided. This data set is referred to as an electoral data set. An electoral data set is unique to each 1st User and to the specific electoral event identified by that 1st User. An electoral data set is any data set used to record a subjective merit, importance or preference, or to facilitate the expression of subjective merit, importance or preference related to a particular electoral event.

In a preferred embodiment, a 1st User choosing to participate in a particular electoral event selects or creates one or more a trust metrics they believe to be appropriate to an electoral event. A trust metric may be conceptualized as consisting at minimum of: a label, by which the metric is identified and an assigned value or values. Example trust metric labels may include: Experience, Honesty, Skills, Judgment, Cognitive abilities, Values, Integrity, Knowledge, Wisdom, or others which a 1st User believes to be applicable to a particular electoral event.

In a preferred embodiment, the selection of a trust metric may be made from a list of preexisting trust metric labels, or a new trust metric may be created by a 1st User. Any number of methods for creation and use of unique metric labels may be employed.

Figure 3:
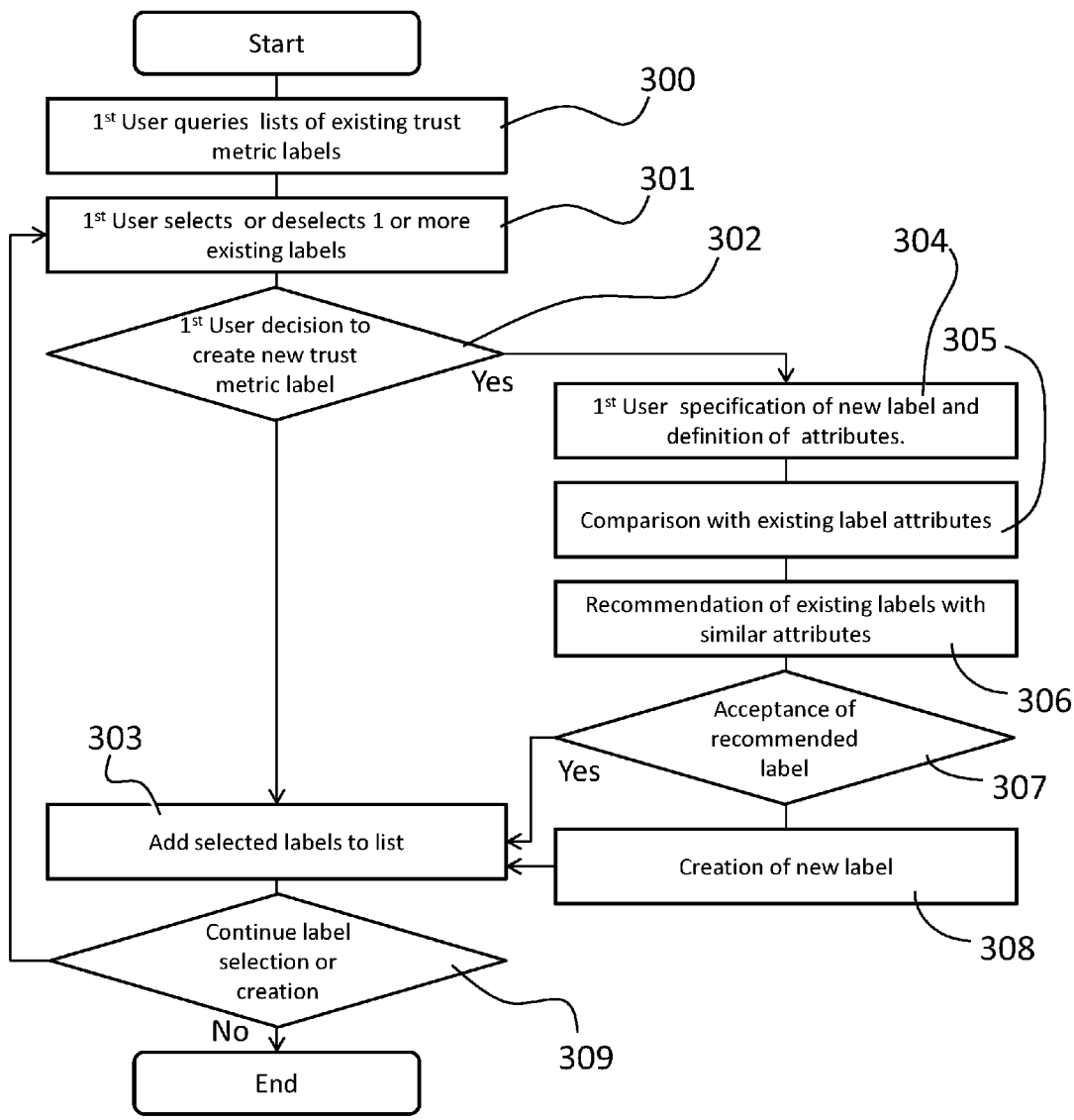
FIG. 3 depicts an exemplary flow of trust metric selection FIG. 3A provides a portion of an exemplary electoral data set FIG. 4 provides an exemplary flow for the weighting of trust metrics FIG. 4A provides a portion of an exemplary electoral data set

An exemplary flow of trust metric selection is presented in FIG. 3 in which a 1st User queries a listing of existing labels 300 and selects 301 those which that 1st User feels are applicable to the specific electoral event. In the circumstance in which prior selections have been made, and a 1st User is reentering the selection flow, trust metric labels may be deselected. Examples of various metric selection methods include but are not limited to: frequency of prior use, alphabetic order, or trust metrics selected previously by a 1st User related to other electoral events. A 1st User may create new trust metric labels for use in place of, or in addition to, existing labels. The example flow depicted in FIG. 3 continues as a 1st User chooses 302 whether to create a new trust metric or not. If the 1st User does not choose to create a new trust metric, those existing trust metrics selected are added to a list 303. If choosing to create a new metric, a 1st User specifies the labels and the attributes 304 of that new trust metric.

Figure 4:
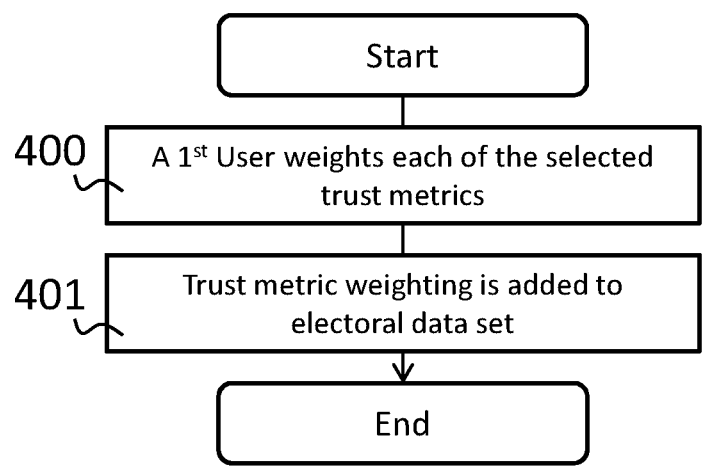

In the example flow of FIG. 4, comparison 305 of the new metric attributes with those of existing metrics are made and similar matches offered to the 1st User 306 as alternatives to a new trust metric creation. A 1st User then chooses 307 the recommended trust metric or to continue with creation of a new trust metric. If new trust metric creation is chosen 307, the new trust metric is created and added to the 1st Users list of selected trust metric labels 308. In the example flow of FIG. 3, a 1st User is offered a choice 309 to re-enter the trust metric selection flow to add or delete trust metric 301 from a list of selected trust metric, or create additional new trust metric.

Figure 3A:
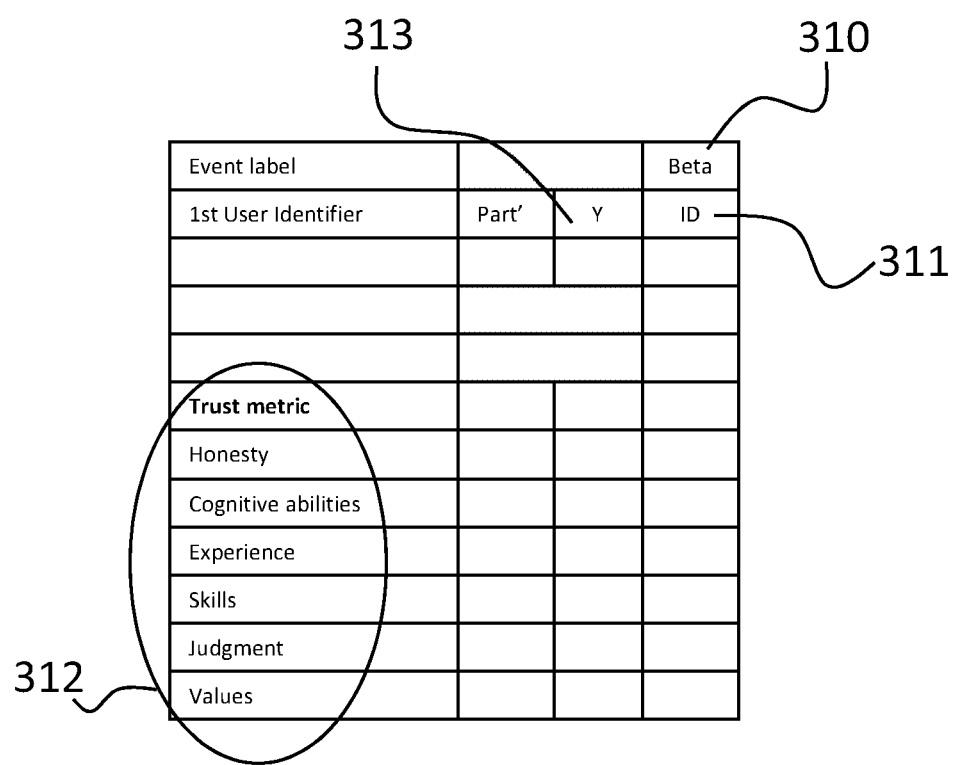

FIG. 3A. provides a portion of an exemplary electoral data set which upon completion of trust metric selection contains: an event label 310, shown in FIG. 3 as "Beta", a unique identifier of the 1st User 311, the trust metrics selected by that 1st User 312, and a binary participation flag 313 indicating intended participation of that 1st User in that electoral event.

Weighting of Trust Metric

Weighting in the context of the present invention is the assignment of subjective value by a 1st User to a trust metric. For example, in a preferred embodiment; a 1st User weighting a particular metric may employ a scale of 0 to 5 where 5 represent the highest importance and 0 the lowest. FIG. 4 provides an exemplary flow for the weighting of trust metrics by a 1st User. Once a 1st User has created a set of one or more trust metrics applicable to an identified electoral event, that 1st User then assigns a weight to each trust metric 400 based upon that $1^{st}$ User's opinion of applicability to the electoral event. Those weighted trust metrics are then added 401 to the electoral data set.

Figure 4A:
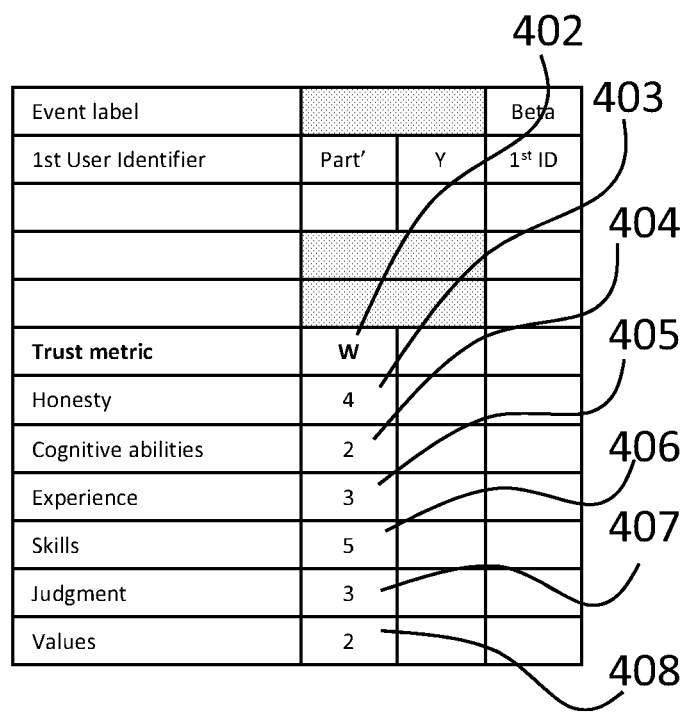

FIG. 4A. provides a portion of an exemplary electoral data set, to which a weighting of each of the trust metrics selected by a 1st User is placed in column "W" 402. In the example of FIG. 4 Honesty has been assigned a weight of "4" by a 1st User and the value has been placed in the cell 403 of column "W" corresponding to the trust metric label "Honesty". Cognitive abilities has been weighted a "2" by that same 1st user and the value placed in the associated cell 404. Likewise, Experience has been weighted 405 a "3", Skills weighted 406 a "5", Judgment, 407 a "3" and finally Values has been weighted 408 a "2". The exemplary method of trust metric weighting of FIG. 4 and FIG. 4A are not to be construed as limiting the use of other weighting methods or data structures employed for the creation and use of dynamic fractional proxy.

Ranking of $2^{nd}$ Users

Ranking in the context of a preferred embodiment of the present invention is an act of a 1st User's assignment of value to represent that 1st User's subjective ranking of an attribute of a specific 2nd User. A flow depicting a preferred embodiment for the ranking of 2nd Users by use of trust metrics is provided in FIG. 5. In the example flow, a 1st User selects 500 from those others users in their social network with whom they have direct relationships, one or more 2nd Users to whom that 1st User may choose to grant proxy. Unique identifiers for those selected 2nd Users are added 501 to the electoral data set. That 1st User selecting the 2nd Users then ranks each selected 2nd User 502 by use of the selected trust metrics and the rankings added 503 to the electoral data set.

Figure 5:
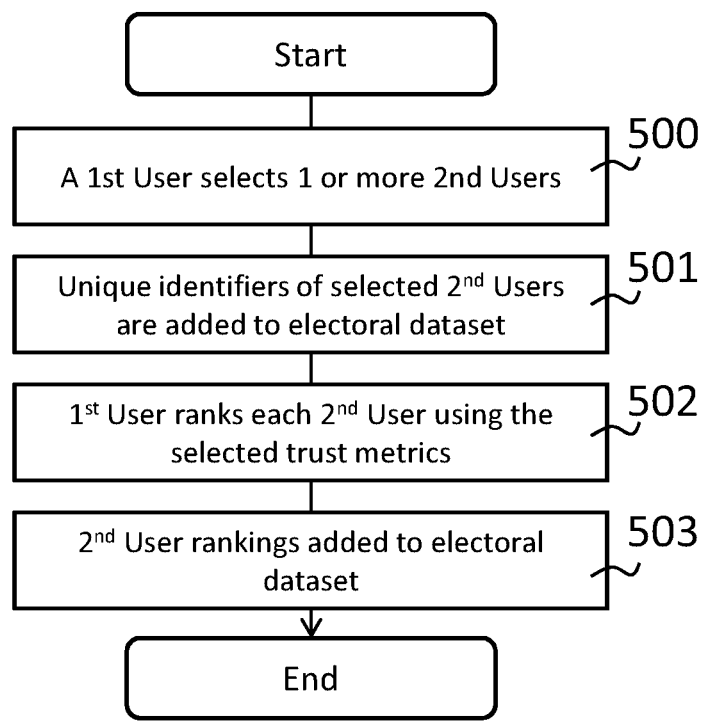
FIG. 5 depicts a preferred flow embodiment for ranking of $2^{nd}$ Users using trust metrics FIG. 5A provides a portion of an exemplary electoral data set

FIG. 5A. provides an exemplary representation of a portion of the electoral data set for electoral event "Beta" in which a unique identifier for a 2nd User "A" 504, and the rankings of 2nd User "A" by the 1st User are placed in the cells of column "R" 505 corresponding to each trust metric. The 1st User conducting the example ranking has employed a scale of 0 to 5 where 5 represent the highest ranking and 0 the lowest. The 1st User has assigned a rank of "2" to represent their opinion of 2nd User "A"s honesty, and the value has been placed in the cell of column "R" corresponding to the trust metric label "Honesty" 506. Following the exemplary method employed for the ranking of 2nd User "A" for Honesty, Cognitive abilities is ranked 507 as a "2" by a 1st User. The remaining rankings of 2nd User "A" by that 1st User for the selected example trust metrics are shown in subsequent cells of column "R". The exemplary method of ranking of trust metric labels of FIG. 5 and FIG. 5A are not to be construed as limiting the present invention's claims to the use of other ranking methods.

Production of Confidence Product

Figure 6:
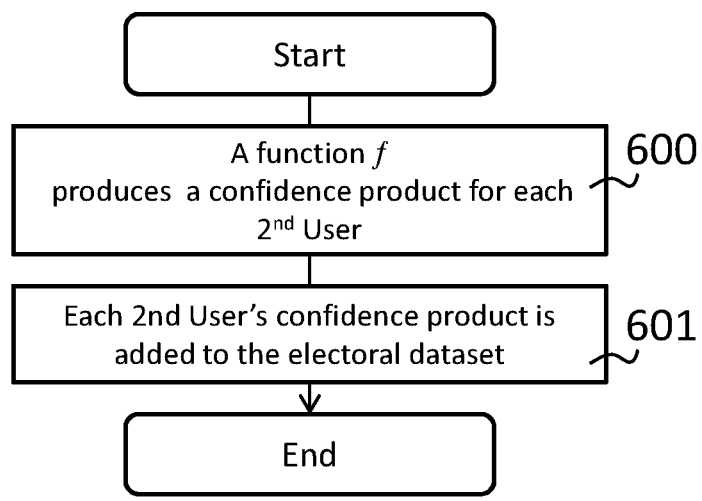
FIG. 6 depicts a flow for creation of a confidence product FIG. 6A provides a portion of an exemplary electoral data set FIG. 7 provides an example flow for the creation of fractional proxy FIG. 7A provides a portion of an exemplary electoral data set FIG. 7B provides an example of an outgoing communication data set FIG. 8 provides a portion of an exemplary electoral data set

In a preferred embodiment of the present invention, a confidence product or products represent a subjective confidence expression by a 1st User of a 2nd User relative to the weight or importance of the trust metrics employed, and the ranking of the selected 2nd User by a 1st User. FIG. 6 depicts an exemplary flow by which a single confidence product is created for each 2nd User selected using the 1st User's weighting of the trust metrics and ranking of each 2nd User as inputs to a function $f$ which produces 600 a confidence product for each 2nd User. These confidence products are added to the electoral data set 601 for the specific electoral event for which a 1st User has created 2nd User rankings. The function $f$ employed in the creation of the confidence product may be any mathematical or logical function or combination thereof and may vary in the input data used. FIG. 6A provides a portion of an exemplary electoral data set to which the product of multiplication of the trust metric weightings in column "W" 602 and rankings in column "R" 603 for 2nd User "A" have been placed in column "P" 604.

The exemplary function employed to produce a confidence product in FIG. 6A operates as follows: the weighting of each trust metric by a 1st User in column "W" 602 is multiplied by the ranking of each trust metric for 2nd User "A" in the adjacent cells of column "R" 603 to produce the interim confidence product shown in column "P" 604. These interim confidence products in column "P" are summed upward to produce a single confidence product 605 for 2nd User "A". A confidence product is likewise produced for each participating 2nd User subsequent to 2nd User "A".

Production of Fractional Proxy

Figure 7:
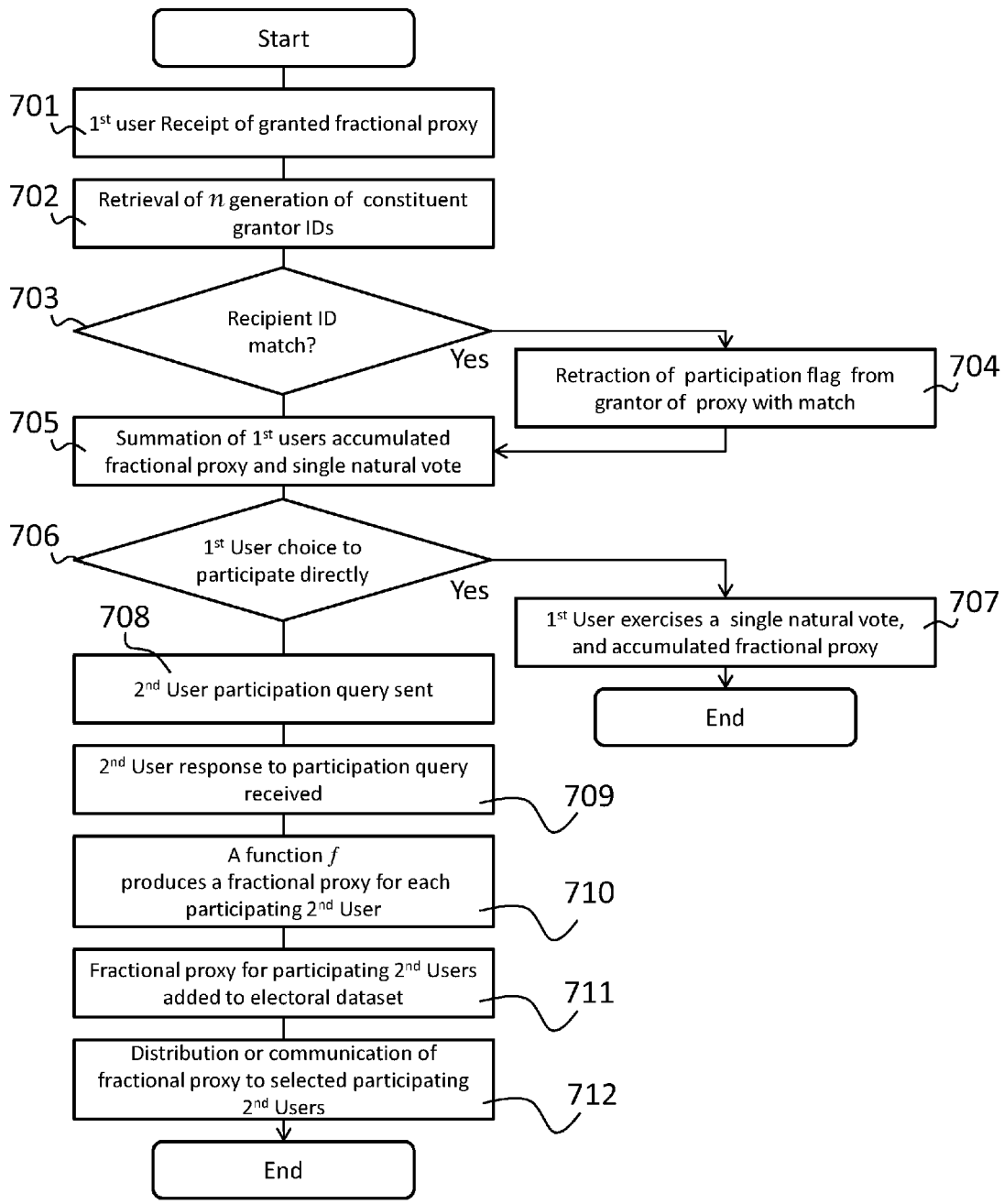

Fractional proxy is generally the division of an individual user's summed proxy for the purpose of granting those divisions to a plurality of users, and is in a preferred embodiment specifically a fractional division of the sum of a user's single whole natural vote and accumulated proxy granted by one or more other users. Fractional proxy from a plurality of users may be accumulated by a single participating user and those fractional proxy may sum to a value greater than one. The creation of fractional proxy may be accomplished by employing any combination of logical or mathematical systems, processes or methods. Once a 1st User has caused the production of a confidence product for each of the selected participating 2nd Users the creation for fractional proxy can take place. FIG. 7 provides an example flow of a preferred embodiment for the production of fractional proxy which begins with receipt 701 of proxy granted by one or more $2^{nd}$ User. The exemplary preferred embodiments provided herein are not to be construed as limiting the claims of the present invention.

Prohibition or Damping of Circular Proxy Grant

The damping or blocking of circular proxy grant is enabled when the recipient $2^{nd}$ User retrieves 702 the unique identifiers of each constituent granting user, and the unique identifiers of the preceding constituent granting users up to n generations of prior grantors of fractional proxy. In a preferred embodiment of damping or blocking of circular proxy, the variable n is an integer value representing some number of preceding generations determined by the probability of the occurrence of circular proxy grant and the influence of circular proxy grant upon the quality of collaborative decision making which is deemed acceptable for the particular electoral event or class of electoral event.

A match check is conducted 703 between the unique identifier of the 2nd User receiving proxy and the unique identifiers of each prior granting constituent user up to n generations of prior grantors of fractional proxy. If a match is found indicating presence of a circular proxy grant, a participation flag is selectively reissued indicating non participation of a recipient $2^{nd}$. User for which a match was found 704 to the granting 1st User from which or through which the circular proxy grant was received. Thus detected circular proxy grants are damped or blocked and the granting 1st User re-creates and re-grants fractional proxy excluding 2nd Users for whom circular proxy grant was detected.

A 1st User choosing 706 to participate in the electoral event chooses to participate either directly or indirectly. If directly participating, a 1st User then exercises 707 in the electoral event a vote which is the summation of the fractional proxy a 1st User has accumulated while acting as a 2nd User, with that 1st User's single whole natural vote. If a 1st User chooses to participate indirectly, the production of fractional proxy commences with a participation query 708 related to the specific electoral event being sent to each selected 2nd User by way of a communications mechanism which in some embodiments may be inherent in, or external to, a social network. A positive response to a query indicates that that specific 2nd User responding intends to participate, directly or indirectly, in that electoral event.

Upon receipt of a response 709, or after receiving no response for a predetermined period following the issuance of participation queries to selected 2nd Users, the 2nd User responses are added to the electoral data set. Lack of response is interpreted as a negative response. Any subsequent change in a 2nd User participation choice is automatically communicated to the electoral data set and initiates re-creation and re-granting of fractional proxy.

In the example of a preferred embodiment the confidence products associated with selected 2nd Users, the participation query response, the 1st User's sum of single whole natural vote, and accumulated proxy are elemental data used as inputs to a function $f$ which produces fractional proxy 710 for each participating 2nd User. These fractional proxy are added to the electoral data set 711. The function $f$ employed in the creation of dynamic fractional proxy may be any combination of mathematical or logical function, system, process, or method. Fractional proxy created for the selected 2nd Users who have indicated intent to participate are then distributed 712 to each selected participating 2nd User.

Figure 7B:
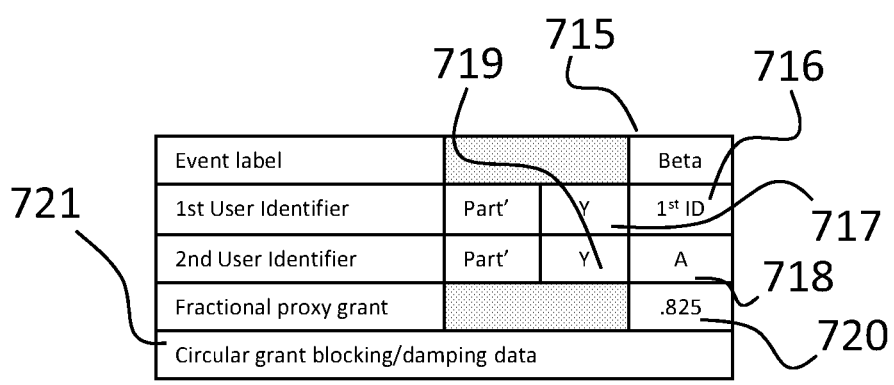

For the exemplary electoral data set, the function employed to create fractional proxy operates as follows: the confidence product for 2nd User "A" is, divided by the sum of the numeric values of the confidence products for all participating 2nd Users selected by the $1^{st}$ User and then further multiplied by the sum of the 1st User's single whole natural vote and accumulated fractional proxy. The fractional proxy of 2nd User "B" is likewise based upon the confidence product for 2nd User "B", and the fractional proxy of 2nd User "C", is based upon the confidence product for 2nd User "C". FIG. 7A provides a portion of an exemplary electoral data set in which the fractional proxy for 2nd User "B" 713 and 2nd User "C" 714 are recorded with that of $2^{nd}$ User "A". FIG. 7B provides an example of an outgoing communication data set which includes; the event label 715, the granting 1st User identifier 716 and participation flag 717, the specific recipient 2nd User identifier 718 and the recipient 2nd User's participation flag 719, the fractional proxy granted by the 1st User to that 2nd User 720, and data necessary to implement the blocking or damping of circular proxy grant 721.

Dynamic Fractional Proxy

Thus far the example based upon a preferred embodiment has detailed the production of fractional proxy. However and in addition, any change of user selections or participation, combination of logical or mathematical functions, selected metrics, weights or ranks, assigned variables, or other elements employed to produce fractional proxy or which comprise the function employed to produce fractional proxy, causes dynamic re-production of the elements, re-granting of fractional proxy, revision of the electoral data set, and communication of revised proxy to all selected 2nd Users. Thus fractional proxy becomes dynamic fractional proxy.

The creation of interim confidence products, confidence products, fractional proxy, as well as dynamic fractional proxy and the distribution of dynamic fractional proxy, may employ any number or kind of inputs and any of a variety or combination of mathematical and logical methods which can be instituted globally using a single method for all nodes in a social network, or customized for individual $1^{st}$ Users. The exemplary or preferred embodiments for the creation of interim confidence product, confidence product, as well as of dynamic fractional proxy and the distribution of dynamic fractional proxy, are not to be construed as limiting the scope of the present invention.

Ongoing Electoral Representation

While the examples provided for the present invention have heretofore been in the context of an electoral event, the claims of the present invention are not to be construed as limited to such electoral events and apply as well to any other collaborative social or societal decision making system, method or process.

In addition to the applicability of dynamic fractional proxy in the context of a general case electoral event, ongoing electoral representation is a special case electoral event. Two ways in which ongoing electoral representation differ from a general case electoral event are time and the specificity of issue or issues. The present invention, when applied to ongoing electoral representation, provides for the creation and distribution of dynamic fractional proxy to a set of selected 2nd Users as when applied to the general case of an electoral event, however in the case of ongoing electoral representation, some 2nd Users have self selected as directly participating representational users in additional to being participants as defined in the general case of an electoral event.

In the exemplary use of dynamic fractional proxy to ongoing electoral representation, those 2nd Users who have self identified as representational users are permitting themselves to be recipients of granted proxy from a plurality of 1st Users. Each of the directly participating representational users thus accumulate and may exercise the sum of proxy in an organized assemblage of directly participating representational users acting together in collaboration for the purpose of making choices related to societal issues, the subject of which may or may not be known to those participating representational users or the 1st User granting proxy, at the time proxy was granted.

As in a general case electoral event, the proxy granted in an ongoing electoral representation is dynamic. Any change in the elements antecedent to issuance of the granted proxy result in dynamic change in proxy. FIG. 8 provides an exemplary ongoing electoral representation data set in which the event label 800 reflects the representational nature of that particular event, and the 2nd User identification 801 indicates the role of representative in that event.

Benefits and Conclusion

The present invention is described in detail with particular reference to certain preferred embodiments, but within the spirit and scope of the invention, it is not limited to such embodiments. It will be apparent to those of skill in the art that various features, variations, and modifications can be included or excluded, within the limits defined by the claims and the requirements of a particular use. The present invention provides numerous benefits, of which some are described below.

The information processing capabilities employed for societal decision making constitute the bounding conditions within which collaboration tales place. Practical limitation of time and space upon communication and the availability of knowledge have historically hindered achievement of the maximal effectiveness of collaborative decision making. These limitations necessitated the compromise of collaborative processes; compromises which included, but were not limited to, exclusion of individuals likely to be affected, abrogation of individual right to decide, restriction of the incremental nature of 1st person collaborative decisions, restraint of corrective feedback, and increased cost of individual participation. The beneficial uses of dynamic fractional proxy include, but are not limited to:

First—Increased Social Involvement

Dynamic fractional proxy use in social networks will enable greater first person participation by those persons potentially affected by social and political decisions, and an increase a sense of individual relevancy for those who participate. A significant challenge to providers of social networking is sustaining and growing involvement of participants against competing uses of discretionary time.

For many segments of society which have traditionally been disenfranchised or apathetic towards social or political processes, use of dynamic fractional proxy in social networking will lower barriers to collaborative engagement. Dynamic fractional proxy offers individuals an opportunity to participate in meaningful, productive, collaborative interactions which will build stronger social ties and cultivate greater rates of sustained participation in social networks.

Second—Productive use of Social Networking

The interaction of individuals within social networks has been largely unproductive, in that the potential for collaboration for social and economic gain within social networks remains largely unrealized. The ability of social networks employing dynamic fractional proxy to facilitate collaborative practices will enable greater productive use of social networks.

Third—Better Societal Decisions

The complexity of collaborative decision making enabled by dynamic fractional proxy will enable better social decisions; meaning decisions which will accommodate greater numbers of direct participants and produce higher levels of satisfaction for larger numbers of participants. Other hallmarks of social decisions quality include less inclination towards categorical decisions, more opportunity to anticipate secondary effects of proposed decisions such as cost transfer to those not represented, and more productive use of finite communal or societal resources.

Dynamic fractional proxy will enable more responsive feedback mechanisms for social activities beyond direct collaboration occurring within a social network. This feedback will result in more responsive societal decision making processes and make possible incremental, iterative collaborative decision making not otherwise achievable.

Finally—Enabling Advancement of Collaborative Decision Making

Dynamic fractional proxy provides the basis for accelerating the evolutionary processes by which collaborative decision making will advance. Use of dynamic fractional proxy will imbue collaborative processes with an adaptive resilience to changing levels and duration of participation without sacrificing decision quality.

The invention claimed is:
1. A method of creating fractional proxy, via a computer, comprising:
receiving from a device of a first User a selection or creation of one or more trust metrics, comprised of a label, a value, and one or more structured elements, wherein the trust metric label, value and the structured elements are stored in a database associated with the first User;

receiving from the device of the first User an assigned valuation to the one or more selected or created trust metrics representing the first User's subjective determination of merit or importance, wherein weight values are assigned to the one or more trust metrics and are stored in the database associated with the first User;

receiving from the device of the first User a selection of a plurality of second Users to whom the granting of fractional proxy by the first User is rendered, wherein a unique identifier for the first User and each selected second User are stored in the database associated with the first User;

issuance of a participation query to the plurality of second Users;

responsive to receiving from one or more selected second Users a response to the participation query, wherein each of the selected second User's response or lack of response are stored in the database as a participation flag;

receiving from the device of the first User a ranking of each participating selected second User, by use of an associated trust metrics, wherein the received rankings of the selected second Users are stored in the database;

receiving from the device of the first User a mathematical and/or logical function for the production of confidence products, wherein the mathematical and/or logical function is stored in the database;

production of a confidence product, for each of the plurality of second Users, representing the first User's subjective confidence in each of the plurality of second User, by use of the mathematical and/or logical function, and the first User's ranking of each of the plurality of second users, wherein the confidence product is stored in a second database associated with each of the selected second Users and the first User;

receiving from the device of the first User a mathematical and/or logical function stored in the database associated with the first User for the production of fractional proxy;

production of the fractional proxy associated with each selected second User, by a division of the first User's summed proxy determined by the mathematical and/or logical function, wherein the fractional proxy created in association with each selected participating second User are stored in the second database, wherein the summed proxy is the sum of all fractional proxies granted to a user in the role of a participating second User as a single natural whole vote.

2. The method of claim 1, wherein the first and second users are participants in a social network.

3. The method of claim 1, wherein the one or more trust metrics are selected from preexisting trust metrics, or created by the first User.

4. The method of claim 3, wherein the creation of the one or more trust metrics are accomplished via a series of prompts to which the first User responds with descriptive data expressing attributes, associations, and characteristics of the created trust metric label.

5. The method of claim 4, wherein an automated comparison of newly created trust metric attributes are made with the attributes of existing metrics and similar matches offered to the first user creating a new trust metric as alternative recommendations for use in place of the new trust metric.

6. The method of claim 1, wherein the value of the trust metric represents a non-binary Real Number weighting assigned by the first User.

7. The method of claim 1, wherein the participation query is comprised of a message sent to the second Users via a social network requesting a response expressing intent or lack of intent to participate in an electoral event.

8. The method of claim 7, wherein communication of the message may be within or external to the construct of the social network.

9. The method of claim 1, wherein the ranking of each of the second Users includes a value assigned by the first User representing the first User's subjective opinion of each of the second user's character based on the first User's interpretation of the meaning of each of the trust metrics employed.

10. The method of claim 1, wherein the mathematical and/or logical function is created by the first User, or selected from functions created by other first users for the production of the confidence products.

11. The method of claim 10, wherein the mathematical and/or logical function employed for the production of confidence products employs any or all of the following elements:
one or more selected trust metrics, weighted value assignment of one or more trust metrics, ranking by a first user of one or more second Users, and the unique identifiers of participating users.

12. The method of claim 10, wherein the creation of the mathematical and/or logical function by the first User for the production of confidence products is accomplished via a series of prompts to which a first User responds by inputting specific desired mathematical and/or logical function.

13. The method of claim 10, wherein the mathematical or logical function for the production of the confidence products is selected by the first User from pre-existing functions.

14. The method of claim 1, wherein the mathematical and/or logical function is created by the first User, or selected from functions created by other first Users, for production of the fractional proxy.

15. The method of claim 14, wherein the mathematical and/or logical function employed for the production of the fractional proxy employs any or all of the following elements:
confidence products, response or lack of response to a participation query by one or more selected second Users, the first User's summed proxy, and unique identifiers of participating users.

16. The method of claim 14, wherein the creation of the mathematical and/or logical function by the first User for the production of the fractional proxy is accomplished via a series of prompts to which the first User responds by inputting the specific desired mathematical and/or logical function.

17. The method of claim 14, wherein the mathematical and/or logical function for the production of the fractional proxy is selected by the first User from pre-existing functions.

* * * * *